(12) United States Patent
Bae et al.

(10) Patent No.: US 6,796,179 B2
(45) Date of Patent: Sep. 28, 2004

(54) SPLIT-RESONATOR INTEGRATED-POST MEMS GYROSCOPE

(75) Inventors: Youngsam Bae, Gardena, CA (US); Ken J. Hayworth, Northridge, CA (US); Kirill V. Shcheglov, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/441,892

(22) Filed: May 16, 2003

(65) Prior Publication Data

US 2004/0050160 A1 Mar. 18, 2004

Related U.S. Application Data

(60) Provisional application No. 60/381,630, filed on May 17, 2002.

(51) Int. Cl.$^7$ .............................................. G01P 9/04
(52) U.S. Cl. ..................................... 73/504.12; 438/50
(58) Field of Search ........................ 73/504.12, 504.02, 73/504.04; 438/50

(56) References Cited

U.S. PATENT DOCUMENTS

| | | | |
|---|---|---|---|
| 6,487,907 B1 | 12/2002 | Tang et al. | 73/504.02 |
| 6,539,801 B1 | 4/2003 | Gutierrez et al. | 73/504.02 |

*Primary Examiner*—John E. Chapman
(74) *Attorney, Agent, or Firm*—Fish & Richardson P.C.

(57) ABSTRACT

A split-resonator integrated-post vibratory microgyroscope may be fabricated using micro electrical mechanical systems (MEMS) fabrication techniques. The microgyroscope may include two gyroscope sections bonded together, each gyroscope section including resonator petals, electrodes, and an integrated half post. The half posts are aligned and bonded to act as a single post.

15 Claims, 6 Drawing Sheets

US 6,796,179 B2

SPLIT-RESONATOR INTEGRATED-POST MEMS GYROSCOPE

CROSS-REFERENCE TO RELATED APPLICATION

This application claims priority to U.S. Provisional Application Ser. No. 60/381,630, filed on May 17, 2002 and entitled Split Resonator Integrated Post MEMS Gyroscope.

ORIGIN OF INVENTION

The U.S. Government has certain rights to this invention pursuant to Grant No. NAS7-1407 awarded by the National Aeronautics & Space Administration (NASA).

BACKGROUND

Multi-axis sensors may be used for inertial sensing of motion in three dimensions. Such sensors may be constructed of relatively large and expensive electromagnetic and optical devices. More recently, micromechanical sensors have been fabricated using semiconductor processing techniques. Micro electrical mechanical systems (MEMS) allow formation of physical features using established semiconductor materials and processing techniques. These techniques enable the physical features to have relatively small sizes and be precise. Specifically, micromechanical accelerometers and gyroscopes have been formed from silicon wafers using photolithographic and etching techniques. Such microfabricated sensors hold the promise of large scale production and lower cost.

Vibratory microgyroscopes ("microgyros") have been produced using MEMS processing techniques. In a vibratory gyroscope, the Coriolis effect induces energy transfer from a driver input vibratory mode to another mode which is sensed or output during rotation of the gyroscope. Silicon micromachined vibratory microgyros may be integrated with silicon electronics. These devices are capable of achieving high quality (Q) factors, can withstand high "g" shocks due to their small masses, are relatively insensitive to linear vibration, and consume little power. However there are several limitations to the current construction method that hinders its mass producability, specifically each microgyro must have a post inserted and bonded individually to function.

SUMMARY

A vibratory microgyroscope may include an upper gyroscope section bonded to a lower gyroscope section. Each gyroscope section may include resonator petals, electrodes, and an integrated half post. The half posts are aligned and bonded to act as a single post.

The gyroscope sections may have a symmetrical design, each include three resonator petals alternating with three electrode sections. The electrodes sections may include drive and sense electrodes for driving and sensing rocking modes, respectively. Each gyroscope section may include a hub connected to an outer ring by spring members. The hub may support the resonator petals and the integrated half post.

The vibratory microgyroscope may be a micro electrical mechanical system (MEMS) device fabricated from silicon-on-insulator (SOI) wafer(s) using semiconductor processing techniques.

DETAILED DESCRIPTION

Figure 1:
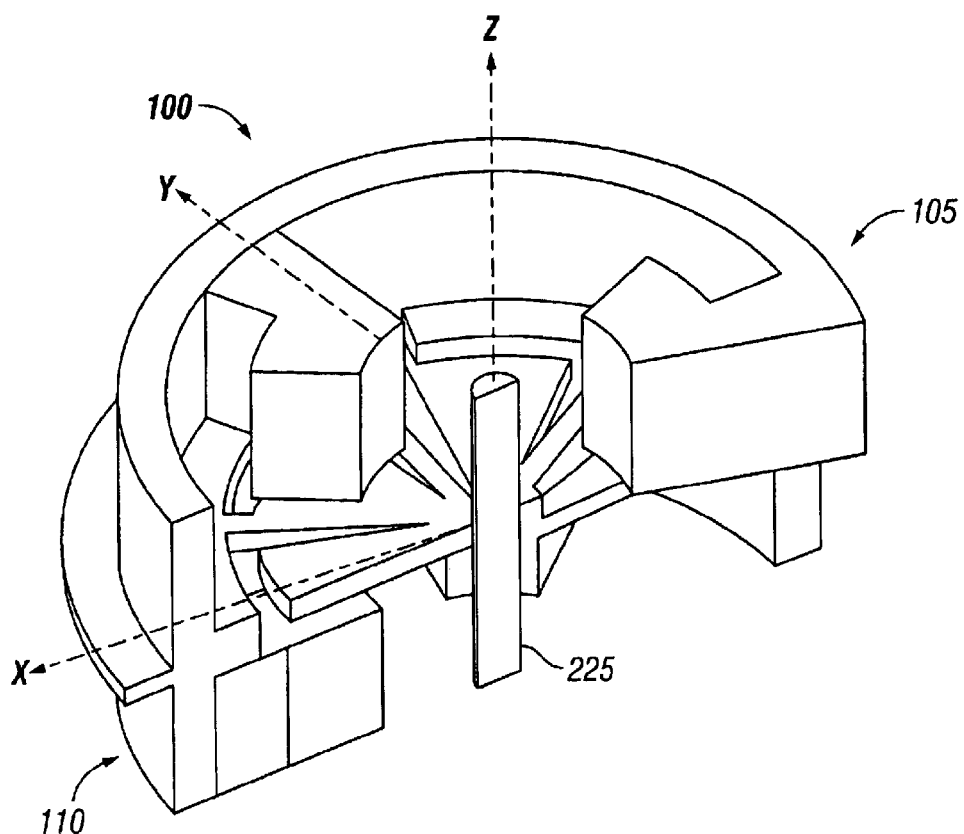
FIG. 1 is a perspective sectional view of a vibratory microgyroscope.
Figure 2A:
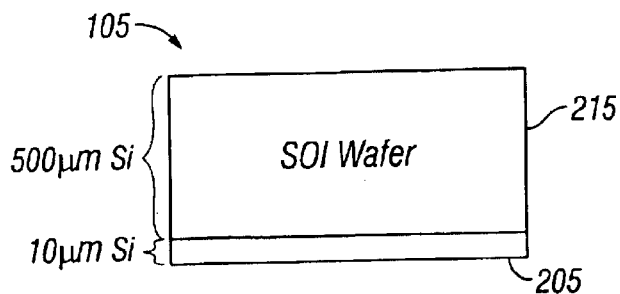
FIGS. 2A–2D show side, bottom, top, and perspective views, respectively, of an upper gyroscope section.
Figure 2B:
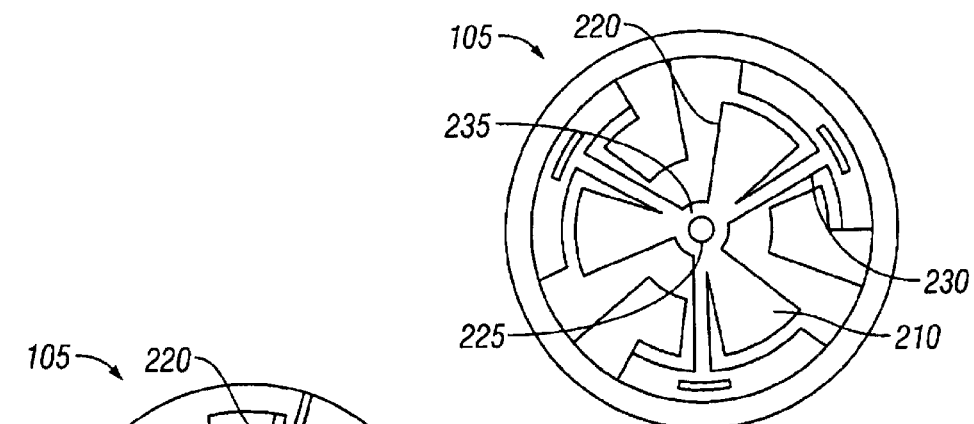
Figure 2C:
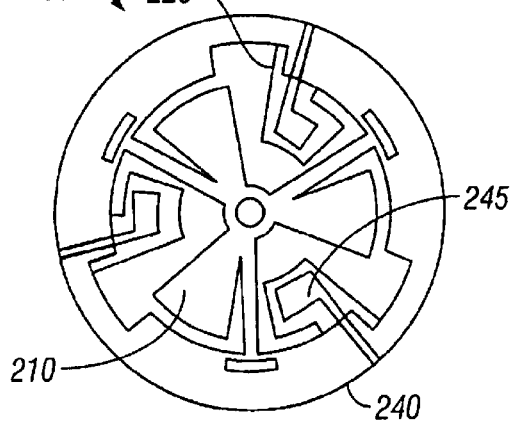
Figure 2D:
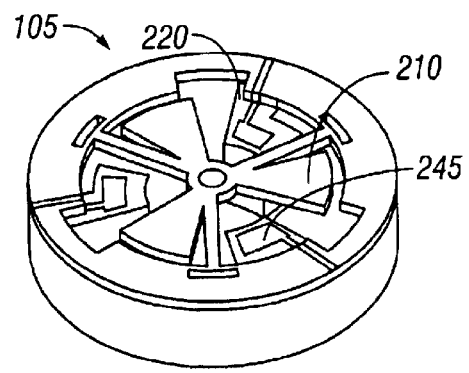
Figure 3A:
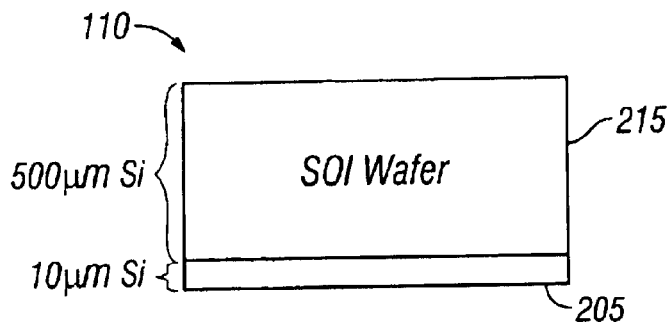
FIGS. 3A–3D show side, bottom, top, and perspective views, respectively, of a lower gyroscope.
Figure 3B:
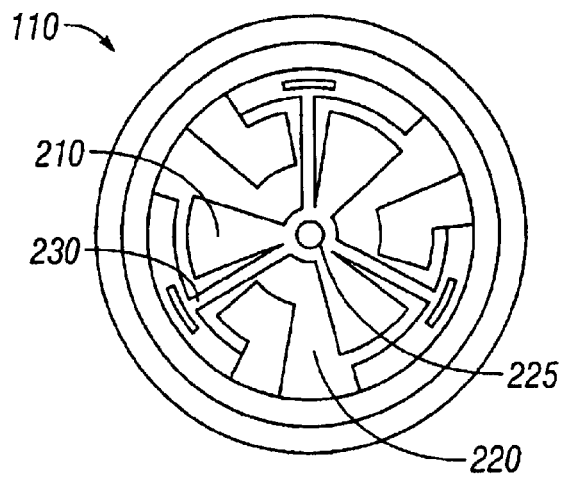
Figure 3C:
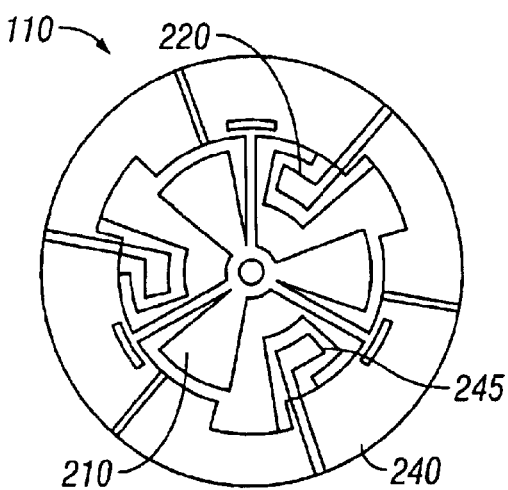
Figure 3D:
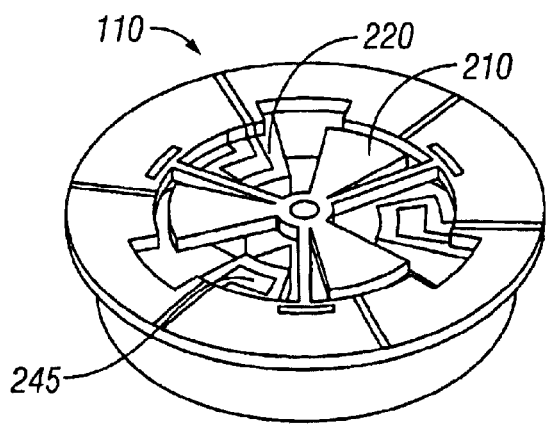

FIG. 1 is a perspective sectional view of a vibratory microgyroscope 100 according to an embodiment. The microgyroscope may have a split design including an upper gyroscope section 105 and a lower gyroscope section 110. Each of the sections may be fabricated from a silicon-on-insulator (SOI) wafer, as will be described below. FIGS. 2A–2D show side, bottom, top, and perspective views, respectively, of the upper gyroscope section 105, and FIGS. 3A–3D show side, bottom, top, and perspective views, respectively, of the lower gyroscope section 110.

Each gyroscope section includes a resonator section 205 including three resonator "petals" 210 offset by 60 degrees, and a base section 215 including three electrode sections 220. Each gyroscope section may also include an integrated half post 225. The resonator petals and half post may be supported by thin resonator springs 230 connecting a hub 235 and the half post 225 to an outer ring 240 in the resonator section. The electrode sections include electrodes 245 used for driving and sensing rocking modes.

The upper and lower gyroscope sections may be bonded together such that the resonator petals 210 of each gyroscope section overlap the electrode sections 220 of the other gyroscope section and the half posts 225 are aligned to form a split post. A capacitive gap between the petals and electrodes may be formed by the opposing resonator section's thickness.

In operation, a potential between the electrodes 245 and the petals 210 pulls the petals closer to the electrodes due to electrostatic forces. This rocks the assembly about a drive axis. Since the resonator is symmetrical, the axis may be the y-axis, x-axis, or a combination of the two. The large post adds inertia to the rocking modes, which aids in coupling the degrees of freedom. Excitation at the drive axis natural frequency may be desirable, since a large response is obtained which boosts the sensitivity of the device. Angular rotation of the frame about the z-axis induces post rocking (via Coriolis acceleration) about a sensing axis orthogonal to the z-axis and the drive axis (e.g., the x-axis if the y-axis is the drive axis). The rocking about the sense axis may be measured capacitively by electrodes 245 on the electrode sections 220. These measurements are related to the angular rate of rotation of the frame.

Typical microgyroscopes require a post (metal or silicon) to be inserted and bonded individually. With the split resonator design, an individual post insertion step is not required, which may facilitate mass-production of the microgyroscopes. The two integrated half posts align to serve as a single post. Both halves of the post are supported by the resonator springs 230 along the midline of the respective gyroscope section, and thus no separate supports are necessary.

Figure 4A:
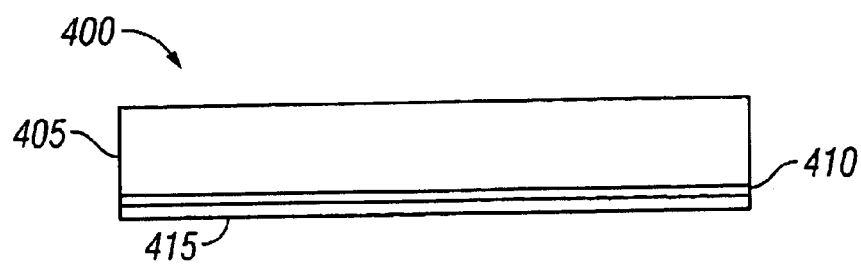
FIGS. 4A and 4B show sectional views of silicon-on-insulator (SOI) wafer sections used to form upper and lower gyroscope sections.
Figure 4B:
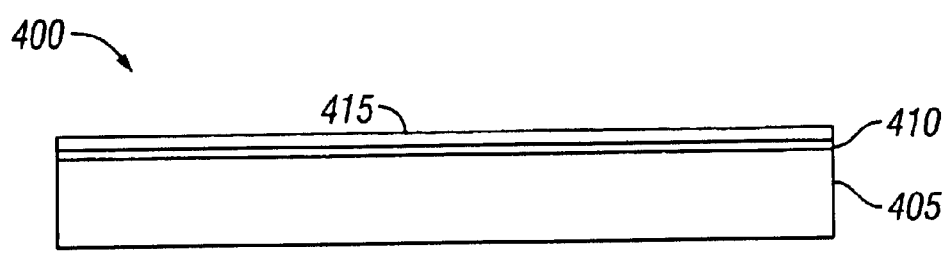
Figure 5A:
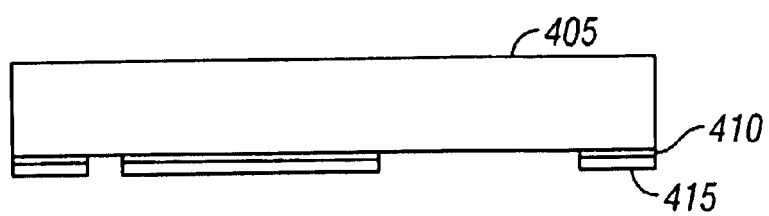
FIGS. 5A and 5B show sectional views of the SOI wafer sections after an etching process to form a clover-leaf resonator petal pattern in a silicon layer.
Figure 5B:
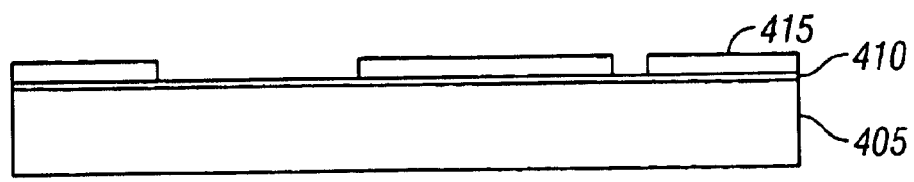

The upper and lower gyroscope sections may be fabricated from silicon-on-insulator (SOI) wafers 400, e.g., with a 500 micron bulk silicon substrate 405 and a 10 micron silicon oxide membrane 410, as shown in FIGS. 4A and 4B. The cloverleaf design of the petals may be etched into the top silicon layer 415 of the SOI wafer using precision etching techniques, as shown in FIGS. 5A and 5B. In similar SOI cloverleaf microgyro designs, etching equipment from Surface Technology Systems plc (STS) of Newport, UK has been used for the precision etching.

Figure 6A:
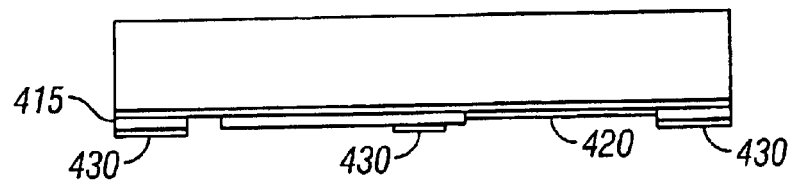
FIGS. 6A and 6B show sectional views of the SOI wafer sections after an electrode deposition process.
Figure 6B:
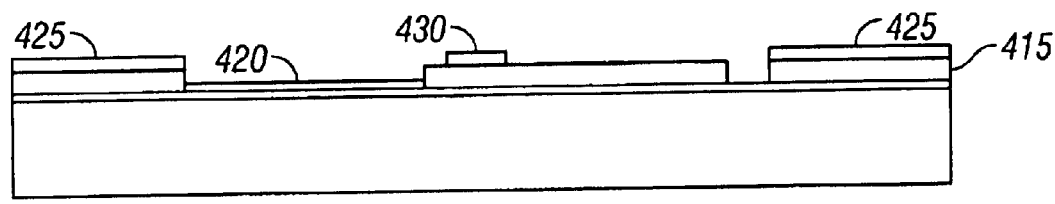
Figure 7A:
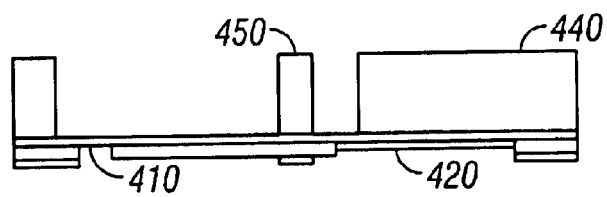
FIGS. 7A and 7B show sectional views of the SOI wafer sections after an etching process to form a frame and integrated half post in the bulk silicon section of the SOI wafer sections.
Figure 7B:
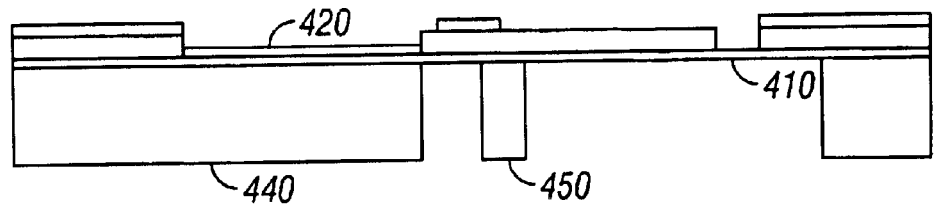
Figure 8A:
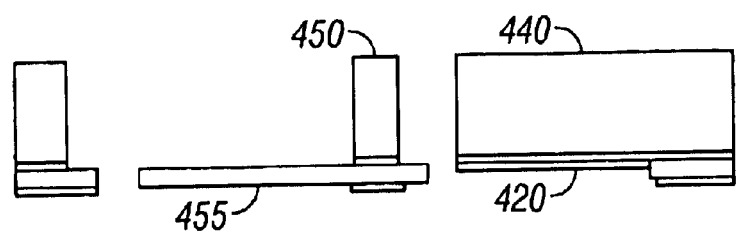
FIGS. 8A and 8B show sectional views of the upper and lower gyroscope sections after an etching process to separate the resonator petals.
Figure 8B:
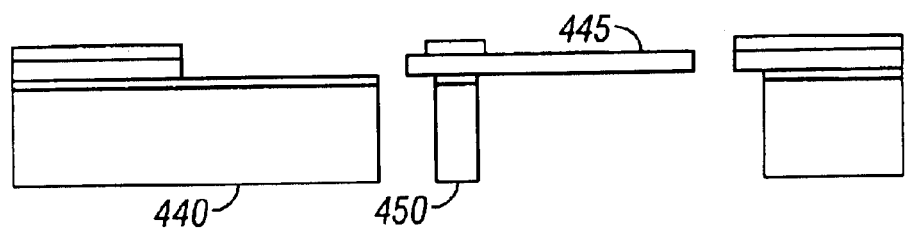

Electrodes 420 may then be deposited and patterned on the insulator membrane in the electrode sections, as shown in FIGS. 6A and 6B. The electrodes may be, e.g., thin film Cr/Au electrodes deposited by thermal evaporation of chromium and gold. Thin film metal layers may also be deposited at feed-through sites 425 and eutectic bonding sites 430 during the thermal evaporation process. The bulk silicon substrate may then be etched to form a frame including the electrode sections 440 and the half post 450 for that section, as shown in FIGS. 7A and 7B. Portions of the oxide membrane 410 may then be etched to free the resonator petals 455, as shown in FIGS. 8A and 8B.

Figure 9:
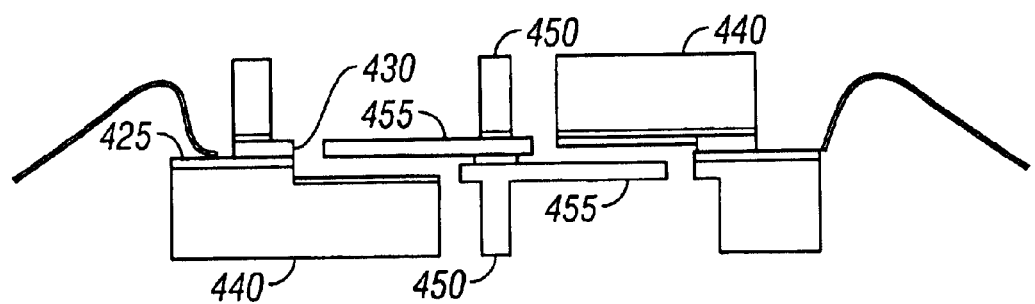
FIG. 9 shows a sectional view of the vibratory microgyroscope.

The gyroscope may be assembled by eutectic-bonding the upper and lower gyroscope sections at the eutectic bonding sites 430 and wire-bonding the feed-throughs 425 to the electrodes 420, as shown in FIG. 9.

As described above, the split-resonator integrated-post MEMS gyroscope may facilitate mass-production of the microgyros. Since an individual post insertion step is unnecessary, the processing steps and time may be independent of the number of devices being produced. Consequently, an entire wafer full of devices may be processed simultaneously.

In alternative embodiments, the resonator section may include different numbers and arrangements of petals and electrodes. The electrode sections may include more than one electrode. Different electrodes on each or different electrode sections may be used for driving and sensing rocking modes.

A number of embodiments have been described. Nevertheless, it will be understood that various modifications may be made without departing from the spirit and scope of the invention. Accordingly, other embodiments are within the scope of the following claims.

What is claimed is:

1. An apparatus comprising:
   an upper gyroscope section including
      a resonator section including a plurality of resonator petals and an integrated half post section, and
      a base section including a plurality of electrode sections, each electrode section including one or more electrodes; and
   a lower gyroscope section, the lower gyroscope section including
      a resonator section including a plurality of resonator petals and an integrated half post section, the half post section being aligned with the half post section in the upper gyroscope section, and
      a base section including a plurality of electrode sections, each electrode section including one or more electrodes.

2. The apparatus of claim 1, wherein each resonator petal in the upper gyroscope section is aligned with an electrode section in the lower gyroscope section, and
   wherein each resonator petal in the lower gyroscope section is aligned with an electrode section in the upper gyroscope section.

3. The apparatus of claim 2, wherein the aligned resonator petals and electrode sections are separated by a distance approximately equal to a thickness of a resonator section.

4. The apparatus of claim 1, wherein the upper gyroscope section is bonded to the lower gyroscope section.

5. The apparatus of claim 1, wherein the apparatus comprises a micro electrical mechanical systems (MEMS) device.

6. The apparatus of claim 1, wherein each of the upper and lower gyroscope sections include three resonator petals and three electrode sections.

7. The apparatus of claim 1, wherein the upper and lower gyroscope sections include drive electrodes and sense electrodes.

8. The apparatus of claim 1, wherein each resonator section includes:
   an outer ring;
   a hub supporting the integrated half post and the resonator petals; and
   a plurality of spring members connecting the hub to the outer ring.

9. A method comprising:
   etching a pattern defining alternating resonator petals and electrode sections into a top silicon layer of a first silicon-on-insulator wafer section;
   etching a pattern defining alternating resonator petals and electrode sections into a top silicon layer of a second silicon-on-insulator wafer section;
   forming electrodes on the electrode sections of the first and second wafer sections;
   etching a bulk silicon section of the first wafer section to form a frame and an integrated half post;
   etching a bulk silicon section of the second wafer section to form a frame and an integrated half post;
   bonding the first and second wafer sections such that the half posts are aligned and bonded to form a split-post microgyroscope.

10. The method of claim 9, further comprising:
   etching the insulator in the first wafer section to release the resonator petals; and
   etching the insulator in the second wafer section to release the resonator petals.

11. A vibratory microgyroscope comprising:
   an upper gyroscope section including
      a resonator section including
         an outer ring,
         a hub connected to the outer ring by spring members,
         a plurality of resonator petals connected to the hub, and
         an integrated half post connected to the hub,
      a base section including a plurality of electrode sections, each electrode section including at least one of a drive electrode and a sense electrode; and
   a lower gyroscope section including
      a resonator section including
         an outer ring,
         a hub connected to the outer ring by spring members,
         a plurality of resonator petals connected to the hub, and
         an integrated half post connected to the hub, a base section including a plurality of electrode sections, each electrode section including at least one of a drive electrode and a sense electrode, wherein the lower gyroscope section is bonded to the upper gyroscope section such that the integrated half posts are aligned.

12. The microgyroscope of claim 11, wherein each resonator petal in the upper gyroscope section is aligned with an electrode section in the lower gyroscope section, and wherein each resonator petal in the lower gyroscope section is aligned with an electrode section in the upper gyroscope section.

13. The microgyroscope of claim 12, wherein the aligned resonator petals and electrode sections are separated by a distance approximately equal to a thickness of a resonator section.

14. The microgyroscope of claim 11, wherein the microgyroscope comprises a micro electrical mechanical systems (MEMS) device.

15. The microgyroscope of claim 11, wherein each of the upper and lower gyroscope sections include three resonator petals and three electrode sections.

* * * * *